United States Patent [19]

Aoyama

[11] Patent Number: 5,400,016
[45] Date of Patent: Mar. 21, 1995

[54] PART-DETECTING DEVICE COMBINED WITH A PART-SUPPLY ROD OF A PART-SUPPLY UNIT

[76] Inventor: Yoshitaka Aoyama, 20-11, Makitsukadai 2-cho, Sakai-shi, Osaka 590-01, Japan

[21] Appl. No.: 977,246

[22] Filed: Nov. 16, 1992

[30] Foreign Application Priority Data

Nov. 23, 1991 [JP] Japan .................. 3-355369
Dec. 14, 1991 [JP] Japan .................. 3-360962

[51] Int. Cl.⁶ .................. G01M 19/00; B65G 43/08
[52] U.S. Cl. .................. 340/674; 198/464.2; 29/714; 29/720; 221/2; 470/45
[58] Field of Search .................. 73/865.8, 865.9; 324/701; 340/568, 674, 679, 681, 686, 687; 29/705, 714, 720, 407; 198/464.2, 468.01, 502.1; 221/2-10; 470/45, 47; 414/14, 222

[56] References Cited

U.S. PATENT DOCUMENTS

| | | | |
|---|---|---|---|
| 2,985,900 | 5/1961 | Nouvelet | 470/45 X |
| 3,480,941 | 11/1969 | Thomas | 221/9 |
| 3,651,985 | 3/1972 | Smith | 198/610 X |
| 3,838,768 | 10/1974 | Owens | 198/534 X |
| 4,134,486 | 1/1979 | Grone | 340/674 X |
| 4,237,605 | 12/1980 | Jung et al. | 29/783 |
| 4,487,310 | 12/1984 | Sansoucy | 340/674 X |
| 4,603,329 | 7/1986 | Bangerter et al. | 340/674 X |
| 4,619,043 | 10/1986 | Takahashi et al. | 29/740 X |
| 4,672,866 | 6/1987 | Riera et al. | 81/57.37 |
| 5,044,519 | 9/1991 | Aoyama | 221/212 |
| 5,067,763 | 11/1991 | Aoyama | 198/468.5 |
| 5,226,228 | 7/1993 | Aoyama | 29/33 K |
| 5,291,645 | 3/1994 | Aoyama | 29/407 |

FOREIGN PATENT DOCUMENTS

| | | | |
|---|---|---|---|
| 682719 | 3/1964 | Canada | 221/9 |
| 4012918 | 10/1990 | Germany . | |
| 1-288522 | 11/1989 | Japan . | |
| 2186274 | 8/1987 | United Kingdom | 221/2 |
| 2239621 | 7/1991 | United Kingdom . | |
| 2244224 | 11/1991 | United Kingdom . | |

OTHER PUBLICATIONS

*Patent Abstracts of Japan:* ABS Grp. M1078, vol. 15, No. 49 (02-284774) Abstract published Feb. 6, 1991.
*Patent Abstracts of Japan:* Abs Grp. M1168, vol. 15, No. 404 (03-166114) Abstract published Oct. 15, 1991.
*Patent Abstracts of Japan:* Abs Grp. P1317, vol. 16, No. 78 (03-267790) Abstract published Feb. 25, 1992.
Patent Abstracts of Japan unexamined applications, M field, vol. 14, No. 69, Feb. 8, 1990, The Patent Office Japanese Government, p. 68 M 932 No. 1-288 522.

*Primary Examiner*—Tom Noland
*Attorney, Agent, or Firm*—Pollock, Vande Sande & Priddy

[57] ABSTRACT

In order to correctly detect whether an individually supplied part is actually mounted on a part-receptive member, a part detector is disposed at a position close to a part-holding member of a part-supply rod. Position-wise relationship between this part detector and the part-receptive member is predetermined in order that the part mounted on the part-receptive member can activate operation of the above-identified part detector to generate a signal for identifying presence of the delivered part while the part-supply rod retreats.

3 Claims, 5 Drawing Sheets

PART-DETECTING DEVICE COMBINED WITH A PART-SUPPLY ROD OF A PART-SUPPLY UNIT

BACKGROUND OF THE INVENTION

1. Field of the Invention

The present invention relates to a device which feeds an individual part held at the tip domain of a part-supply rod to a predetermined objective position. More particularly, the invention relates to a device for checking and confirming whether an individually delivered part has correctly been mounted on a part-receptive member, or not.

2. Description of the Prior Art

There is such a preceding art related to a part-detecting device combined with a part-supply rod of a part-supply system. This preceding art was previously proposed by the Applicant of the present invention as per the Japanese Patent Application No. 63-117650 of 1988, filed on May 4th, 1988. The content of this preceding invention was disclosed in the Japanese LaidOpen Patent Publication No. HEI 1-288522 of 1989.

Substantially, the present invention relates to a novel art improved from the preceding invention cited above.

As a matter of fact, none of those conventional part-supply devices can correctly check and confirm whether each part is actually present in a predetermined part-receptive member, or not. As a result, a movable electrode may improperly be operated without practical effect or a part-receptive member built in a part-detecting device may uselessly proceed to the following process without actually holding a nut, thus adversely affecting the whole part-supply system to normally follow up further processes. Although either a photoelectric tube or a phototransistor may be available for checking and confirming the presence of the supplied part in position, it in turn involves much difficulty to correctly detect the presence of the delivered part in position with high precision in limited narrow space from the viewpoint of the arrangement of the part-supply device based on the art proposed by the preceding invention cited above.

SUMMARY OF THE INVENTION

Therefore, the present invention has been achieved to fully solve those technical problems described above. Characteristically, the invention provides a novel part-detecting means at a position close to a part-holding member of a part-supply rod. The art embodied by the invention sets positionwise relationship between the part-detecting unit and a part-receptive member so that an individual part transferred onto the part-receptive member can activate operation of the part-detecting unit to output a signal for identifying presence of the delivered part at the moment when the part-supply rod retreats itself. More particularly, the part-detecting unit embodied by the invention correctly identifies presence or absence of an individual part on the part-receptive member synchronous with the retreating stroke of the part-supply rod. The part-detecting unit is set to a position close to the part-holding member provided for the part-supply rod, and yet, the positionwise relationship between the part mounted on the part-receptive member and the part-detecting unit is predetermined. Therefore, the part-detecting system embodied by the invention securely detects presence or absence of an individual part mounted on the part-receptive member synchronous with the retreating movement of the part-supply rod, thus securely preventing those technical problems cited earlier from occurrence otherwise caused by absence of the part. Furthermore, since the part-detecting unit is secured to the part-supply rod, the part-detecting unit can correctly identify the relative position between the part-detecting unit and the delivered part, thus effectively promoting reliability to correctly detect presence or absence of the suppliable part. Provision of a phototransistor for composing the part-detecting unit can also be materialized by way of merely occupying minimal space.

The invention provides a groove which extends itself in the axial direction on the external circumferential surface of the part-supply rod, where the groove accommodates a cable extended from the part-detecting unit. The cable accommodated in the groove is free from incurring obstruction while the part-supply rod moves forward and backward. Since the cable extended from the part-detecting unit is fully buried in the groove formed in the part-supply rod as mentioned above, the cable is totally free from incurring obstruction while the part-supply rod moves back and forth.

The invention provides the part-supply rod with a lengthy conductive plate along the stroking direction of the part-supply rod in the perfectly insulated condition, where a conductive shoe is held in contact with the lengthy conductive plate to permit the conductive shoe to generate a signal which identifies presence or absence of the suppliable part so that the signal can be transmitted to a control circuit unit provided for the part-supply system. In this way, the signal output from the part-detecting unit is transmitted to the control circuit unit of the part-detecting system via the conductive plate and the conductive shoe. Characteristically, since the conductive shoe is held in contact with the conductive plate, the signal identifying presence or absence of the suppliable part is securely transmitted to the control circuit unit of the part-supply system, thus ideally promoting accuracy in the part detecting operation.

DESCRIPTION OF THE PREFERRED EMBODIMENTS

Before disclosing full aspects of the part-detecting device according to an embodiment of the invention, referring to FIGS. 12 through 15 accompanying this specification, detailed structure of the part-detecting device embodied by the preceding invention cited earlier as the prerequisite of the improved device embodied by the invention is described below.

Figure 12:
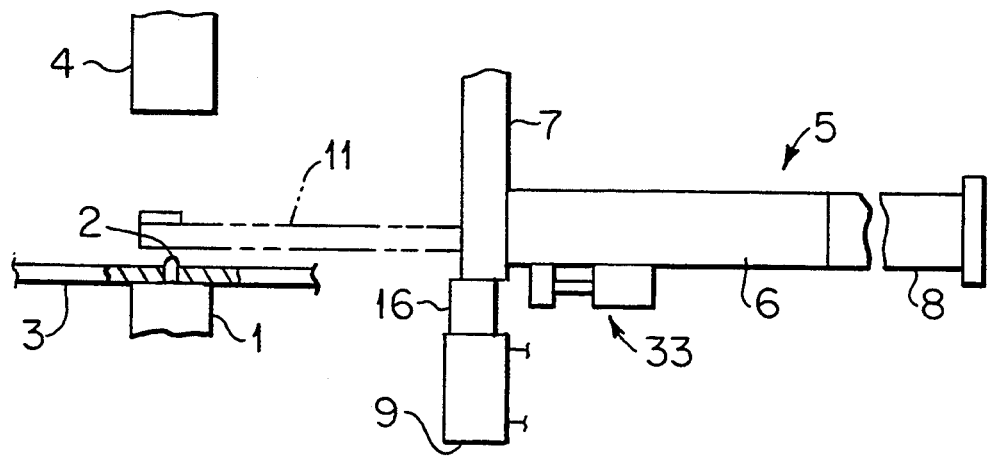
FIG. 12 is an overall lateral view of the conventional part-detecting device related to the preceding invention.

As shown in FIG. 12, a component member 3 made of steel plate substantially being a part-receptive member is mounted on a stationary electrode 1 provided for a soft-welding machine, where a guide pin 2 vertically penetrates the component member 3 made of steel plate. The reference numeral 4 shown in FIG. 12 designates a movable electrode. A part-supply unit 5 is provided, which comprises the following; a part-supply tube 7 connected to an end of an external cylinder 6 via a welding process, another cylinder 8 connected to the other end of the external cylinder 6, and an operating member 9 which transfers an individual part to a part-supply rod 11 from the part-supply tube 7.

Figure 13:
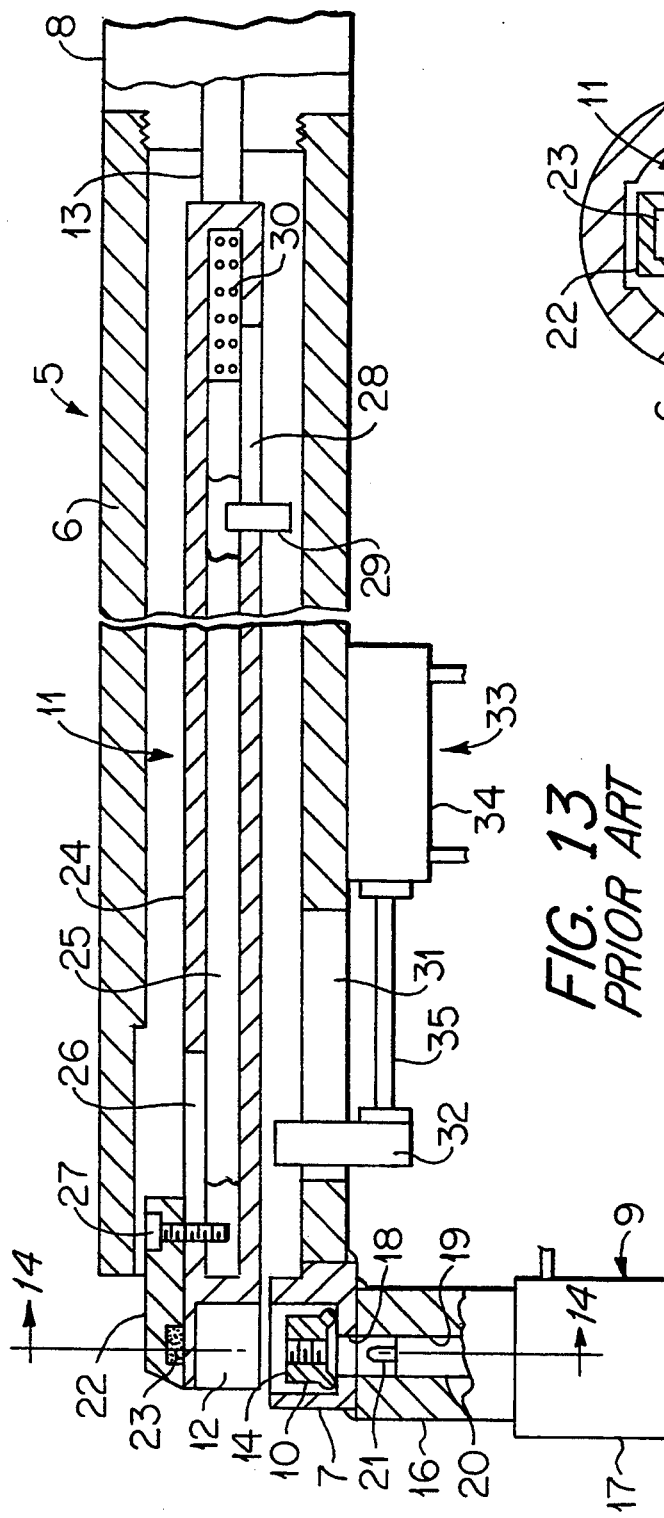
FIG. 13 is a vertical sectional view of the conventional part-detecting unit shown in FIG. 12.
Figure 14:
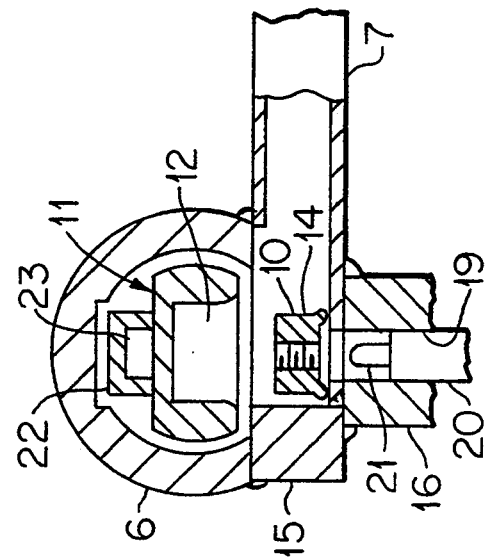
FIG. 14 is a vertical sectional view of the conventional part-detecting device shown in FIG. 13 across section line 14—14.

Referring now to FIGS. 13 and 14, detailed structure of the part-supply device 5 according to the preceding invention is described below. A projective unit designated by the reference numeral 10 is accommodated in the part-supply device 5. A part-holding member 12 accommodating an individually supplied nut 10 is provided inside of the part-supply rod 11. As is clear from FIGS. 13 and 14, the part-holding member 12 is provided with a cubical recess having an aperture at one end. The part-supply rod 11 is accommodated in the external cylinder 6 and connected to a piston rod 13 of a pneumatic cylinder 8. A part-stopping member 14 opening itself to one side is secured to an end of the part-supply tube 7, where the open side of the part-stopping member 14 is opposite from the part-holding member 12 via very narrow clearance. A stopper piece 15 is welded as shown in FIG. 14 so that the halting position of the supplied nut 10 can correctly be determined. The operating member 9 is secured to the back of the part-supply tube 7 via a distance piece 16. Although a variety of operating members including an electromagnetic solenoid may be made available, the art embodied by the preceding invention introduces a pneumatic cylinder 17. A through-hole 18 penetrating the part-supply tube 7 and another through-hole 19 penetrating the distance piece 16 interlink with each other, where these through-holes 18 and 19 are respectively coaxial with a screwing hole of the nut 10 at the halting position. An operating rod 20 is slidably inserted through these through-holes 18 and 19, where the operating rod 20 is connected to a piston rod (not shown) of the pneumatic cylinder 17. A positioning pin 21 is secured to the tip of the operating rod 20. The positioning pin 21 is arranged to penetrate the screwing hole of the nut 10.

There are a variety of means for securely holding the nut in the part-holding member 12 of the part-supply rod 11. For example, a pair of thin-plate springs may be secured to opposite inner walls of the part-holding member 12 to mildly sandwich the nut 10. However, the art of the preceding invention introduces a magnet as a convenient means. Electromagnets may also be introduced by way of surrounding the part-supply rod 11. However, the preceding invention introduces a permanent magnet 23. Concretely, a sliding body 22 is held in close contact with the external surface of the part-supply rod 11, and yet, a permanent magnet 23 is buried in a position corresponding to the position of the part-holding member 12. The part-supply rod 11 is of double structure comprising an outer rod 24 and an inner shaft 25. A lengthy hole 26 is provided in the stroking direction of the outer rod 24. A bolt 27 penetrating the lengthy hole 26 integrates the sliding body 22 with the inner shaft 25. Another lengthy hole 28 is provided above the part-supply rod 11 by way of extending itself in the stroking direction of the inner shaft 25. A control pin 29 secured to the inner shaft 25 projects itself as shown in FIG. 13. A coil spring 30 is inserted between the inner shaft 25 and the outer rod 24. Resilience generated by the coil spring 30 is received by the control pin 29 by causing the coil spring 30 to hit against the left-end of the lengthy hole 28.

Figure 15:
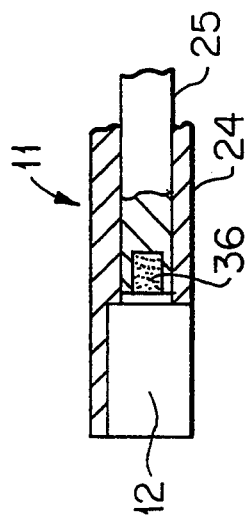
FIG. 15 is a vertical sectional view of the tip domain of the conventional part-supply rod embodied by the preceding invention cited earlier.

Another lengthy hole 31 extending itself in the stroking direction of the outer rod 24 is provided below the external cylinder 6. A stopper piece 32 moves from external side to internal side. A drive unit 33 is materialized by means of a pneumatic cylinder 34 which is secured to the external surface of the external cylinder 6, where the piston rod of this pneumatic cylinder 34 is connected to the stopper piece 32. Relative position of the stopper piece 32 against the control pin 29 is disposed on an imaginary axial line so that the stopper piece 32 can be brought to a position close to the control pin 29 whenever the part-supply rod 11 strokes itself by a predetermined amount. In order to more effectively apply the force of the magnet 23 to the nut 10, those components including the outer rod 24, the inner shaft 25, and the sliding body 22, shall be made of stainless steel which is substantially non-magnetic, FIG. 13 illustrates the state in which the nut 10 is received by the stopper piece 15 upon arrival of the nut 10 at the part-stopping member 14 via the part-supply tube 7. The delivered nut 10 is set to a position opposite from the recess of the part-holding member 12. Now, when the operating rod 20 is activated to move forward by the drive force generated by the pneumatic cylinder 17, the positioning pin 21 proceeds itself inside of the screwing hole of the nut 10, and as a result, the nut 10 is pushed upward before being inserted in the part-holding member 12, and then the nut 10 is temporarily attracted by the permanent magnet 23. Then, as soon as the operating rod 20 returns to the original position, the pneumatic cylinder 8 outputs drive force in order to move the part-supply rod 11 forward. While this condition is underway, the part-supply rod 11 continuously moves on forward without varying the relative position between the permanent magnet 23 and the part-holding member 12 which internally holds the nut 10. As soon as the nut 10 arrives at the predetermined position, the part-supply rod 11 halts itself. When this condition is entered, the control pin 29 is already at a position very close to the stopper pin 32. Next, the pneumatic cylinder 34 contracts itself to compulsorily move the permanent magnet 23 to the right via the stopper piece 32, the control pin 29, the inner shaft 25, the bolt 27, and the slidins body 22 before the permanent magnet 23 eventually leaves the nut 10. As a result, attractive magnetic force applied onto the nut 10 fully goes off. In consequence, the nut 10 is freed from the state of being held at the objective position, and then, the nut 10 correctly matches the guide pin 2 shown in FIG. 12. FIG. 15 illustrates the case in which a permanent magnet 36 is secured to the tip of the inner shaft 25 subsequent to the halted movement of the sliding body 22.

Referring now to FIGS. 1 through 6, detailed aspects of the part-detecting device provided for the part-supply rod according to an embodiment of the invention are described below. Note that those components provided for the part-supply rod embodied by the invention are respectively designated by those reference numerals identical to those which are made available for the part-detecting device previously described in reference to FIGS. 12 through 15.

An outer rod 24 is extended furthermore in the direction of the tip domain from a part-holding member 12 of a part-supply rod 11. In consequence, this makes up an extended member 37 to which a part-detecting means 38 is secured. Although a variety of components including a plurality of adjoining switches or a phototransistor may effectively be made available for composing a part-detecting means, the embodiment of the invention introduces a limit switch 42 for example.

Figure 2:
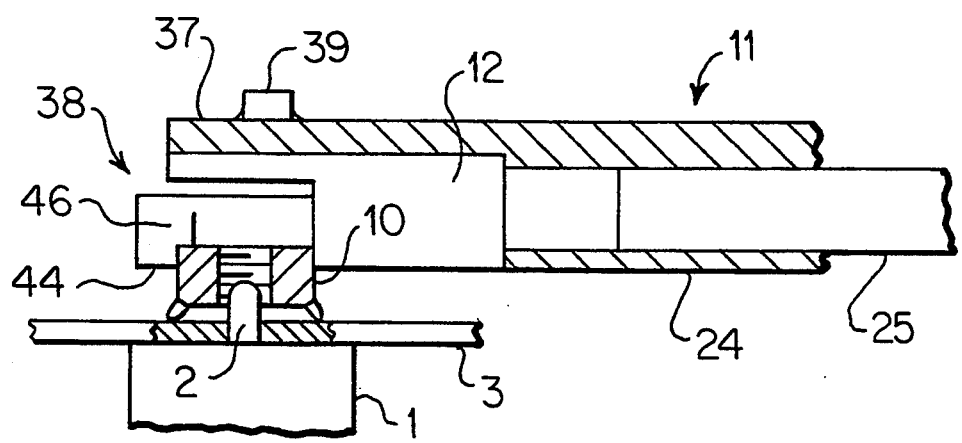
FIG. 2 is a vertical sectional view of the part-supply rod which is under transitional state of the part-supply operation according to an aspect of the invention.
Figure 3:
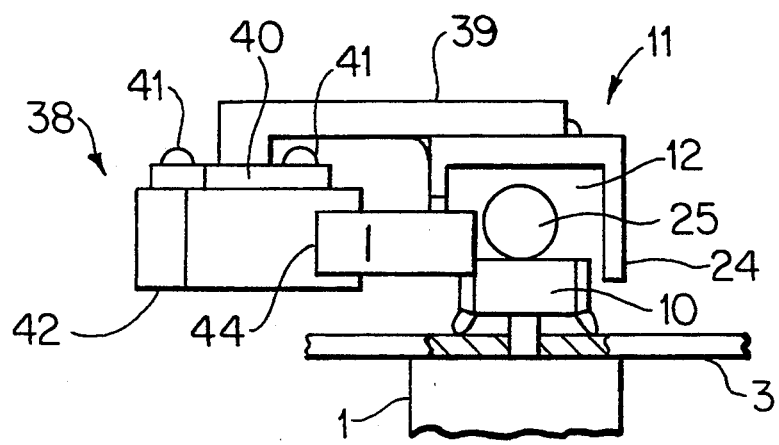
FIG. 3 is a front view of the part-supply rod embodied by the invention.
Figure 4:
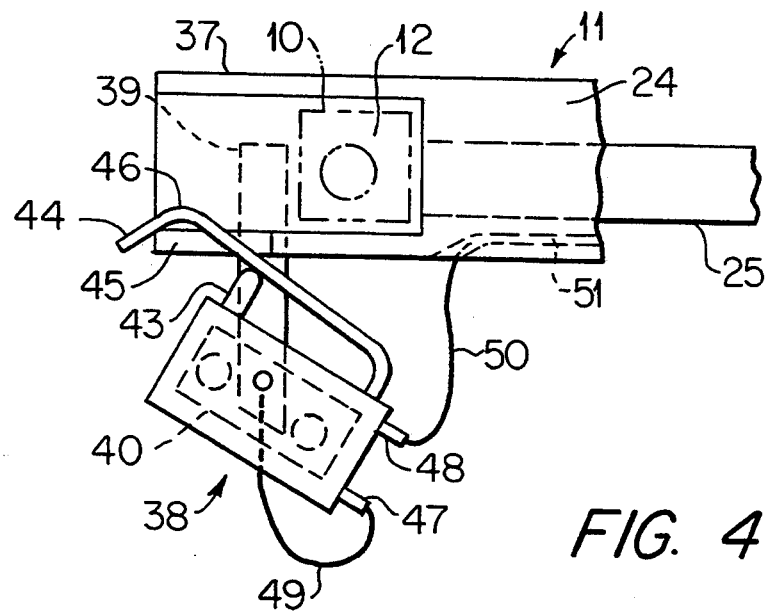
FIG. 4 is a bottom view of the tip domain of the part-supply rod embodied by the invention.
Figure 5:
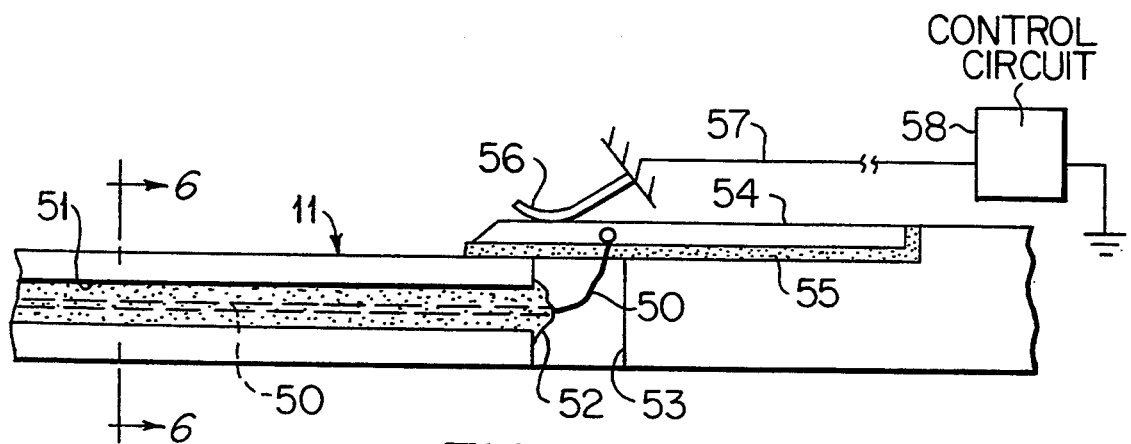
FIG. 5 is a partial lateral view of the part-supply rod embodied by the invention.
Figure 6:
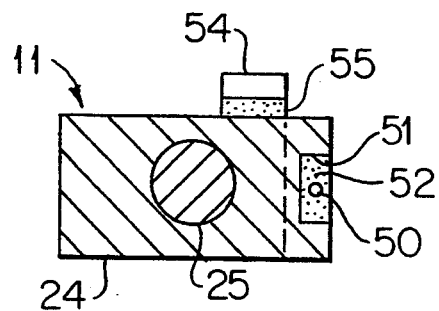
FIG. 6 is a sectional view of the part-supply rod shown in FIG. 5 across line 6 through 6.

Structurally, an arm 39 is secured to the extended member 37 via a welding process. A fixing plate 40 is integrally secured to the arm 39, where a limit switch 42 is secured to the fixing plate 40 with a bolt. The limit switch 42 incorporates a contact. An operating element 43 available for opening and closing the built-in contact projects itself as shown in FIG. 4. An operating arm 44 is provided by way of swinging itself in order to move the operating element 43 back and forth. A cut-off domain 45 is provided on a lateral surface of the outer rod 24. The operating arm 44 projects itself in the internal direction of the outer rod 24 from the cut-off domain 45. A curved domain 46 is provided for the operating arm 44 to enable the curved domain 46 to come into contact with an individually supplied nut 10. As shown in FIG. 2, the relative position of the nut 10 on a steel-plate part 3 and the limit switch 42 substantially being a part-detecting means is pre-determined in order that the curved domain 46 of the operating arm 44 can be brought into contact with the lateral surface of the nut 10 whenever the part-supply rod 11 retreats itself. A pair of cables 49 and 50 are discretely connected to a cathode terminal 47 and an anode terminal 48 of the limit switch 42, where the cable 49 is connected to the arm 39 for grounding. A groove 51 is formed by way of extending itself in the axial direction on the external surface of the outer rod 24. The groove 51 accommodates the other cable 50. As shown in FIG. 5, the groove 51 is filled with synthetic resin 52 to fully bury the cable 50 therein. Another cut-off domain 53 is formed on the lateral surface of the outer rod 24 to permit the cable 50 to pass through it before being connected to a conductive plate 54. The conductive plate 54 comprises a lengthy member which is secured in the stroking direction of the part-supply rod 11. The conductive plate 54 is insulated from the outer rod 24 by means of an insulating member 55 and secured to this insulating member 55. A conductive shoe 56 is secured to a stationary member like an external cylinder 6 in the insulated condition (not shown) with adhesive agent. The conductive shoe 56 itself is elastically held in contact with the conductive plate 54. A cable extended from the conductive shoe 56 is connected to a control circuit unit 58. Upon receipt of a predetermined signal from the conductive shoe 56, the control circuit unit 58 activates a movable electrode 4 and again enables the following nut 10 to be fed to the part-holding member 12.

Figure 1:
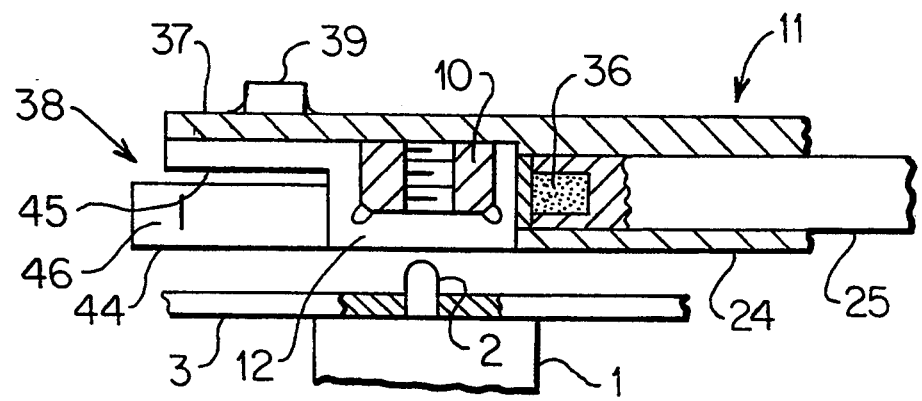
FIG. 1 is a vertical sectional view of the tip domain of the part-supply rod embodied by the invention.

Next, operation of the part-detecting device embodied by the invention is described below. FIG. 1 schematically illustrates the state in which the part-supply rod 11 moves forward while the supplied nut 10 is still held in the part-holding member 12, where the retained nut 10 is coaxially aligned with a guide pin 2. While this condition is present, the inner shaft 25 is retracted to the right to cause the nut 10 to fall downward before correctly matching the guide pin 2. Next, the part-supply rod 11 retreats furthermore. In consequence, as shown in FIG. 2, the operating arm 44 swings itself after coming into contact with the lateral surface of the nut. 10. This in turn causes the operating element 43 to be pushed in the downward direction so that it can transmit a signal for identifying the presence of the delivered nut 10 in the part-holding member 12. For any reason, if no nut were delivered to the part-holding member 12, the operating arm 44 remains still without swinging itself at all while the part-supply rod 11 retreats. In response, the switch 42 outputs a signal for identifying the absence of the nut 10 so that this signal can be transmitted to the control circuit unit 58.

Next, referring to FIGS. 7 through 10, detailed aspects of the part-detecting device incorporating a sensing switch functioning as a part-detecting means embodied by the invention are described below. Note that those components provided for the part-detecting device embodied by the invention substantially being identical to those which are made available for the above embodiment of the invention are respectively designated by the identical reference numerals.

Figure 9:
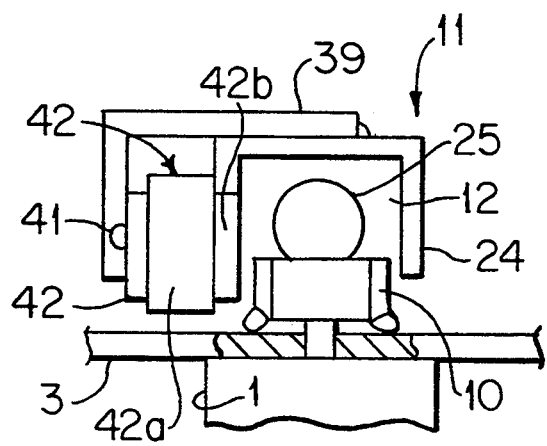
FIG. 9 is a front view of the part-detecting device similar to the one shown in FIG. 3.
Figure 10:
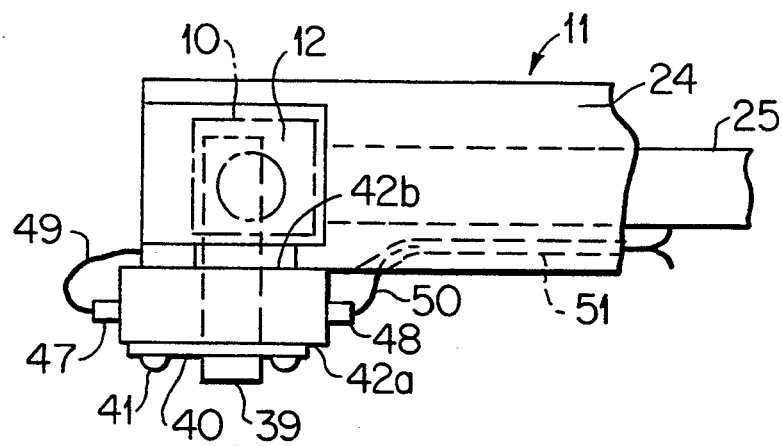
FIG. 10 is a bottom view of the part-detecting device similar to the one shown in FIG. 4.

Concretely, a part-detecting means comprising a sensing switch is inwardly secured to a part-holding member 12 of a part-supply rod 11. An arm is connected to the top surface of an outer rod 24 via a welding process. A fixing plate 40 is integrally secured to the arm 39, where a sensing switch 42 is secured to the fixing plate 40 with a bolt 41. The sensing switch 42 comprises a main body 42a and a sensing member 42b, where the surface of the sensing member 42b faces a part-holding member 12. As shown in FIGS. 9 and 10, the relative position of a nut 10 on a steel-plate part 3 and the sensing member 42b of the sensing switch 42 substantially making up a part-detecting means is predetermined in order that the sensing member 42b can precisely face the lateral surface of the accommodated nut 10 while the part-supply rod 11 retreats itself. Cables 49 and 50 are discretely connected to a cathode terminal 47 and an anode terminal 48 of the sensing switch 42, where the cable 49 is connected to the tip domain of the outer rod 24 for grounding. A groove 51 is formed by way of extending itself in the axial direction on the external surface of the outer rod 24. The groove 51 accommodates the other cable 50. As was already described in association with FIGS. 5 and 6, the groove 51 is filled with synthetic resin 52 to fully bury the cable 50 therein. A cut-off domain 53 is formed on the lateral surface of the outer rod 24 to permit the cable 50 to pass through it before being connected to a conductive plate 54. The conductive plate 54 comprises a lengthy member which is secured in the stroking direction of the part-supply rod 11. The conductive plate 54 is insulated from the outer rod 24 by means of an insulating member 55 and secured to the insulating member 55 with adhesive agent. A conductive shoe 56 is secured to a stationary member like an external cylinder 6 in the insulated condition. The conductive shoe 56 itself is elastically held in contact with the conductive plate 54. A cable 57 extended from the conductive shoe 56 is connected to a control circuit unit 58. Upon receipt of a predetermined signal from the conductive shoe 56, the control circuit unit 58 activates operation of a movable electrode 4 or again feeds a nut 10 to the part-holding member 12.

Figure 7:
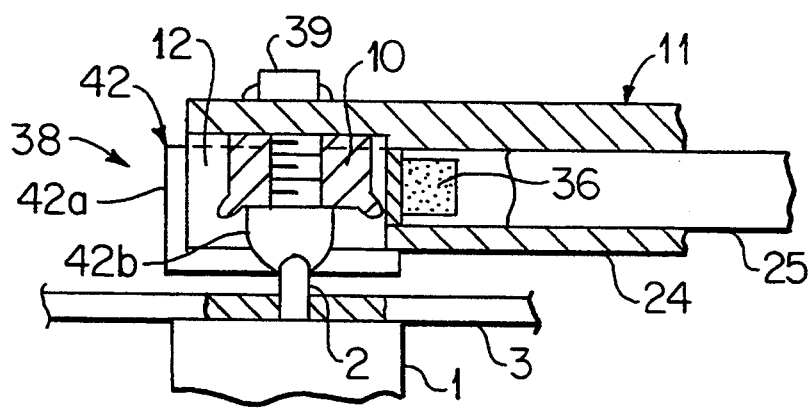
FIG. 7 is a vertical sectional view of the part-detecting device according to another embodiment of the invention similar to the one shown in FIG. 1.
Figure 8:
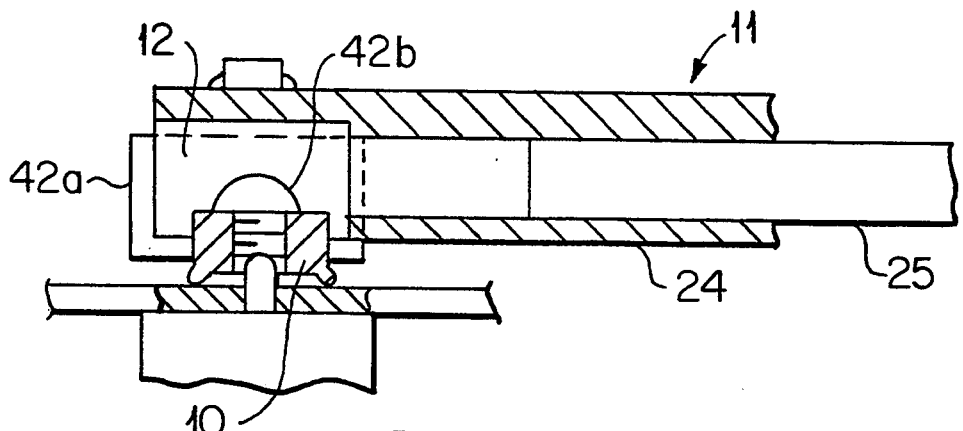
FIG. 8 is a vertical sectional view of the part-detecting device similar to the one shown in FIG. 2.

Next, operation of the part-detecting device embodied by the invention is described below. FIG. 7 schematically illustrates the state in which the part-supply rod 11 moves forward while the supplied nut 10 is still held in the part-holding member 12, where the nut 10 is coaxially aligned with a guide pin 2. While this condition is underway, the inner shaft 25 is retracted to the right to cause the nut 10 to fall downward before correctly matching the guide pin 2. Next, the part-supply rod 11 is again retracted furthermore to cause the sensing switch 42 thus far sensing the nut-10 to leave the nut 10. In consequence, the state of signal designating insensible condition of the nut is converted into a signal for identifying presence of the nut 10 in the part-holding member 12. On the other hand, for any reason, if no nut were delivered to the part-holding member 12, the sensing switch 42 does not activate its own operation at all while the part-supply rod 11 retreats. In response, the part-detecting system outputs a signal for identifying the absence of the nut in the part-holding member 12 so that this signal can be transmitted to the control circuit unit 58.

The above embodiment disposes the sensing switch 42 and the operating arm 44 so that these can respectively face the lateral surface of the inserted nut 10. However, the embodiment of the invention also permits to disposing of both the sensing switch 42 and the operating arm 44 above the top surface of the nut 10.

Figure 11:
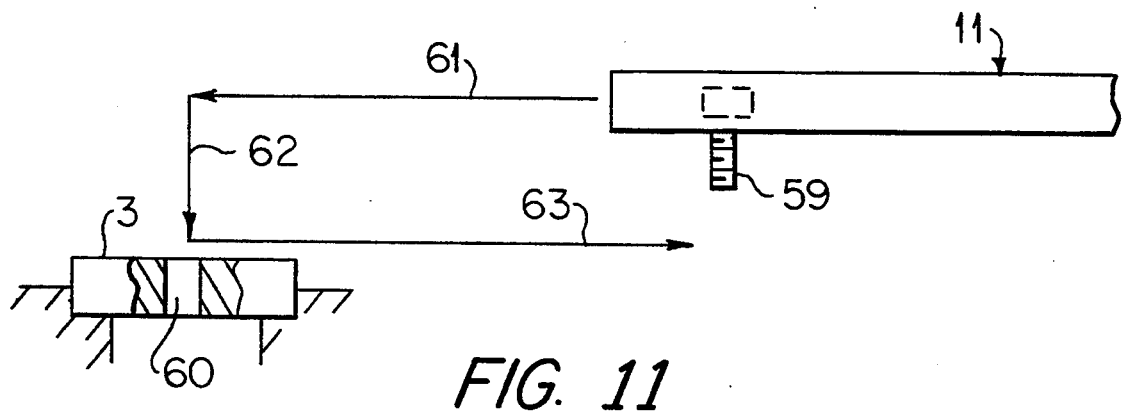
FIG. 11 is a schematic diagram designating functional operation of the part-supply rod when embodied by the invention in the course of dealing with a bolt as a supplied part.

FIG. 11 schematically illustrates an embodiment of the invention, where a bolt 59 is inserted in a through-hole 60 of a part-receptive member 3. Even when executing this method, the art embodied by the invention can securely generate satisfactory part-detecting operation as was done for the above embodiment by properly shifting the part-supply rod 11 in the arrowed directions 61, 62, and 63.

What is claimed is:

1. A device for detecting presence or absence of an individually supplied part in a part-supply rod, wherein a part-detecting means is set to a position close to a part-holding member of said part-supply rod, and wherein a positionwise relationship between said part-detecting means and a part-receptive member is predetermined in order that an individual part mounted on said part-receptive member can activate operation of said part-detecting means to generate a signal for identifying presence of said individual part in said part-supply rod;

wherein an axial-directional groove is formed on an external circumferential surface of said part-supply rod; and further wherein a cable extended from said part-detecting means is accommodated in said groove.

2. A device for detecting presence or absence of an individually supplied part in a part-supply rod as defined in claim 1, wherein an insulated lengthy conductive plate is secured to said part-supply rod in a stroking direction of said part-supply rod, and wherein a conductive shoe is held in contact with said conductive plate in order that said conductive shoe can transmit a signal for identifying the presence of absence of said individual part in said part-supply rod to a control circuit unit while said part-supply rod retreats.

3. An assembly for, detecting the presence of absence of an individually supplied part, the assembly comprising:

a reciprocating part-supply rod for supplying a preselected part to a pickup point;

part-detecting means positioned adjacent a part holding means of the part-supply rod for detecting the presence of a part on a part-receptive member, :the part-receptive member having a preselected positional relationship to the part-detecting means for causing activated operation of the part-detecting means by the part positioned in the part-supply rod;

wires connected at first ends thereof to an output of the part-detecting means for carrying an electrical signal indicative of activated operation of the part-detecting means;

means formed on an external circumferential surface of the part-supply rod for receiving the wires;

an insulated conductive plate secured to the part-supply rod, second ends of the wires being connected to the plate;

a conductive shoe held in contact with the conductive plate for conducting the electrical signal from the plate to a control circuit, indicating the presence or absence of said individual part in the part-supply rod, while the part-supply rod withdraws from the pickup point.

* * * * *